United States Patent
McKinney et al.

(10) Patent No.: US 7,484,692 B1
(45) Date of Patent: Feb. 3, 2009

(54) INTEGRATED ABORT ROCKET AND ORBITAL PROPULSION SYSTEM

(75) Inventors: Bevin C. McKinney, Gig Harbor, WA (US); Gary C. Hudson, Redwood City, CA (US)

(73) Assignee: HMX, Inc., Reno, NV (US)

( * ) Notice: Subject to any disclaimer, the term of this patent is extended or adjusted under 35 U.S.C. 154(b) by 329 days.

(21) Appl. No.: 10/987,442

(22) Filed: Nov. 12, 2004

(51) Int. Cl.
*B64G 1/40* (2006.01)
*B64G 1/00* (2006.01)

(52) U.S. Cl. ............... 244/172.3; 244/158.9; 244/171.1

(58) Field of Classification Search ... 244/171.1–171.4, 244/172.2, 172.3, 158.9, 169, 159.3, 63
See application file for complete search history.

(56) References Cited

U.S. PATENT DOCUMENTS

| | | | | |
|---|---|---|---|---|
| 3,232,560 A | * | 2/1966 | Moise et al. | 244/159.3 |
| 3,289,974 A | * | 12/1966 | Cohen et al. | 244/159.3 |
| 3,929,306 A | * | 12/1975 | Faget et al. | 244/159.3 |
| 3,955,784 A | * | 5/1976 | Salkeld | 244/171.1 |
| 4,796,839 A | * | 1/1989 | Davis | 244/171.3 |
| 4,802,333 A | * | 2/1989 | Smith | 60/260 |
| 4,802,639 A | * | 2/1989 | Hardy et al. | 244/2 |
| 5,117,758 A | * | 6/1992 | Renzi | 102/378 |
| 5,129,602 A | | 7/1992 | Leonard | |
| 5,141,181 A | * | 8/1992 | Leonard | 244/172.2 |
| 5,143,327 A | * | 9/1992 | Martin | 244/171.3 |
| 5,143,328 A | * | 9/1992 | Leonard | 244/171.3 |
| 5,203,844 A | * | 4/1993 | Leonard | 244/171.3 |
| 5,217,187 A | * | 6/1993 | Criswell | 244/171.3 |
| 5,417,049 A | * | 5/1995 | Sackheim et al. | 60/260 |
| 5,568,901 A | * | 10/1996 | Stiennon | 244/63 |
| 5,667,167 A | * | 9/1997 | Kistler | 244/110 E |
| 5,927,653 A | * | 7/1999 | Mueller et al. | 244/171.3 |
| 6,557,803 B2 | * | 5/2003 | Carpenter et al. | 244/159.3 |
| 6,612,522 B1 | * | 9/2003 | Aldrin et al. | 244/2 |
| 6,629,673 B2 | * | 10/2003 | Casillas et al. | 244/171.1 |
| 6,666,409 B2 | * | 12/2003 | Carpenter et al. | 244/159.3 |
| 6,685,141 B2 | | 2/2004 | Penn | |
| 7,080,809 B2 | * | 7/2006 | Hall | 244/172.2 |
| 2003/0052232 A1 | * | 3/2003 | Hall | 244/172 |

OTHER PUBLICATIONS http://en.wikipedia.org/wiki/Apollo_spacecraft.*
http://www.boeing.com/defense-space/space/propul/SSME.html.*
http://www.eere.energy.gov/hydrogenandfuelcells/storage/hydrogen_storage.html (Mar. 9, 2004).*

(Continued)

*Primary Examiner*—Michael R Mansen
*Assistant Examiner*—Joshua J Michener
(74) *Attorney, Agent, or Firm*—Stiennon & Stiennon

(57) ABSTRACT

An orbital stage system has an orbital stage and one or more launch stages. The orbital stage incorporates an orbital maneuvering system (OMS) and an abort propulsion system which both utilize the same propellants, propellant tankage, and propellant pressurization system, but which employ radically different engines. The OMS engines are comprised of at least two engines which have a combined thrust in the neighborhood of $\frac{1}{10}$ the weight of the orbital stage, an area ratio of 50 or more and an operating life of many hundred seconds, preferably many thousands of seconds or more. The abort engine may be a single engine and typically has a thrust of three, four, or more times the weight of the vehicle and an area ratio in the neighborhood of two and an operating life of at most a few tens of seconds.

1 Claim, 2 Drawing Sheets

OTHER PUBLICATIONS http://www.my-scifi-stuff.com/nasa/nasa_x33.html (Sep. 3, 2002).*
http://en.wikipedia.org/wiki/Space_Shuttle_Main_Engine.*
http://www.amsat.org/amsat/sats/phase3d/400n.html.*
Columbia Encyclopedia (2004) "escape velocity" definition.*
Columbia Encyclopedia, 2004 definition of "vapor pressure" retrieved online at www.xreferplus.com.*
Wikipedia, RL-10, http://en.wikipedia.org/wiki/RL-10.*
Wikipedia, Space Shuttle Main Engine, http://en.wikipedia.org/wiki/SSME.*
NASA, Rocket Thrust Equation, http://www.grc.nasa.gov/WWW/K-12/airplane/rockth.html.*
Wertz, James R. et al., Space Mission Analysis and Design, 1999, Microcosm Press et al., Third Edition, pp. 685-718.*
"The X Van Candidate for the X PRIZE" web page printout, http://www.tour2space.com/xvan/xvan.htm Sep. 15, 2004, 3 pp.
"Gemini-B" web page printout, http://skyrocket.de/space/doc_sdat/gemini-b.htm Sep. 15, 2004, 2 pp.
"Innovation rockets Canadian astronauts to new heights" web page printout, http://www.innovation.gc.ca/gol/innovation/stories.nsf/vengss/ss01028e.htm Sep. 15, 2004, 2 pp.
Web page printout http://www.popsci.com/popsci/aviation/article/0,12543,447494-6,00.html Jul. 30, 2004, 1 p.
Printout from Newsgroups: sci.space.policy, Subject: Re: SAS and NSS Oppose NASA's SLI Funding, Nov. 11, 2000, 05:51:43 GMT, 1 p.

* cited by examiner

INTEGRATED ABORT ROCKET AND ORBITAL PROPULSION SYSTEM

BACKGROUND OF THE INVENTION

The present invention relates to orbital launch systems in general, and more particularly to manned orbital systems which incorporate a manned orbital stage.

Launch vehicles, while continuing to improve in reliability, nevertheless have rates of failure which are a concern if they are used to transport people into space. As with high performance jet aircraft, which are also subject to rates of failure which would be considered high for military or commercial transport, the overall safety of a spacecraft which carries passengers is considerably enhanced if it is provided with a system for separating the passenger carrying portion of the vehicle from the other stage or stages of the launch vehicle. The Mercury and Apollo capsules, as well as Russian manned spacecraft have used a solid rocket motors which can pull the capsule away from the launch vehicle during the early portion of the boost phase. To reduce the performance penalty of carrying these solid rockets abort motors, they are jettisoned as soon as they are no longer needed.

The Gemini-B spacecraft which was to be used for the USAF Manned Orbital Laboratory Program incorporated both ejection seats and six solid rocket retrofire motors which served double duty as abort rockets for separating the Gemini from the Titan 3M in the event of launch vehicle failure. Moreover, if not used for abort, the same solid rocket motors could be used to deorbit the Gemini-B spacecraft. Other manned launch vehicle designs such as an early design for the Shuttle Orbiter proposed firing an escape rocket system after it was no longer needed for an abort to add velocity to the manned orbital stage. In still other proposed manned vehicle concepts, engines used during the boost phase can also be used as abort engines.

Since the announcement of the shuttle retirement in 2010, a clear need has been identified for a manned orbital vehicle which can be developed before the shuttle retirement date. Such a rapidly developed manned orbital system requires new concepts for integrating vehicle functions to achieve highly reliable lightweight systems with operational simplicity.

SUMMARY OF THE INVENTION

The orbital stage system of this invention includes an orbital stage and one or more launch stages. The orbital stage incorporates an orbital maneuvering system (OMS) and an abort propulsion system which both utilize the same propellants, propellant tankage, and propellant pressurization system, but that employ radically different engines. The orbital maneuvering system (OMS) engines are comprised of at least two engines which have a combined thrust in the neighborhood of 1/10 the weight of the orbital stage, an area ratio of 50 or more and an operating life of many hundred seconds, preferably many thousands of seconds or more. The abort engine may be a single engine and will typically have a thrust of three, four, or more times the weight of the vehicle and an area ratio in the neighborhood of two and an operating life of at most a few tens of seconds.

The orbital maneuvering system engines employ a cooling system which is substantially reusable, such as film cooling, transpirational cooling, or regenerative cooling. On the other hand, the abort engine which has as operating time of 10 to 20 seconds can use a relatively simple ablative, or ablative/heat sink/filmdump chamber. The construction design, and manufacture of the abort engine is further simplified by the insensitivity of the design to throat erosion, or other factors which affect engine performance, allowing the use of lighter weight less-expensive materials. The abort engine remains reusable because it normally is not fired, and thus the unfired engine serves the same function on multiple flights.

One of three pressurization systems may be used. The propellants may be stored as high-pressure gases, liquid propellants may be pressurized with lightweight high-pressure gas such as helium via a regulator, or liquid propellants may be stored at a temperature which produces a vapor pressure sufficient to drive the propellants into the OMS engines, or the abort engine.

It is a feature of the present invention to provide an orbital stage which has abort capability along the entire launch trajectory with minimum weight attributable to the abort system.

It is another feature the present invention to provide an orbital stage system of increased safety and low complexity.

It is a further feature of the present invention to provide a lighter weight orbital stage by using some vehicle systems to perform multiple compatible functions.

Further objects, features and advantages of the invention will be apparent from the following detailed description when taken in conjunction with the accompanying drawings.

DESCRIPTION OF THE PREFERRED EMBODIMENTS

Figure 1:
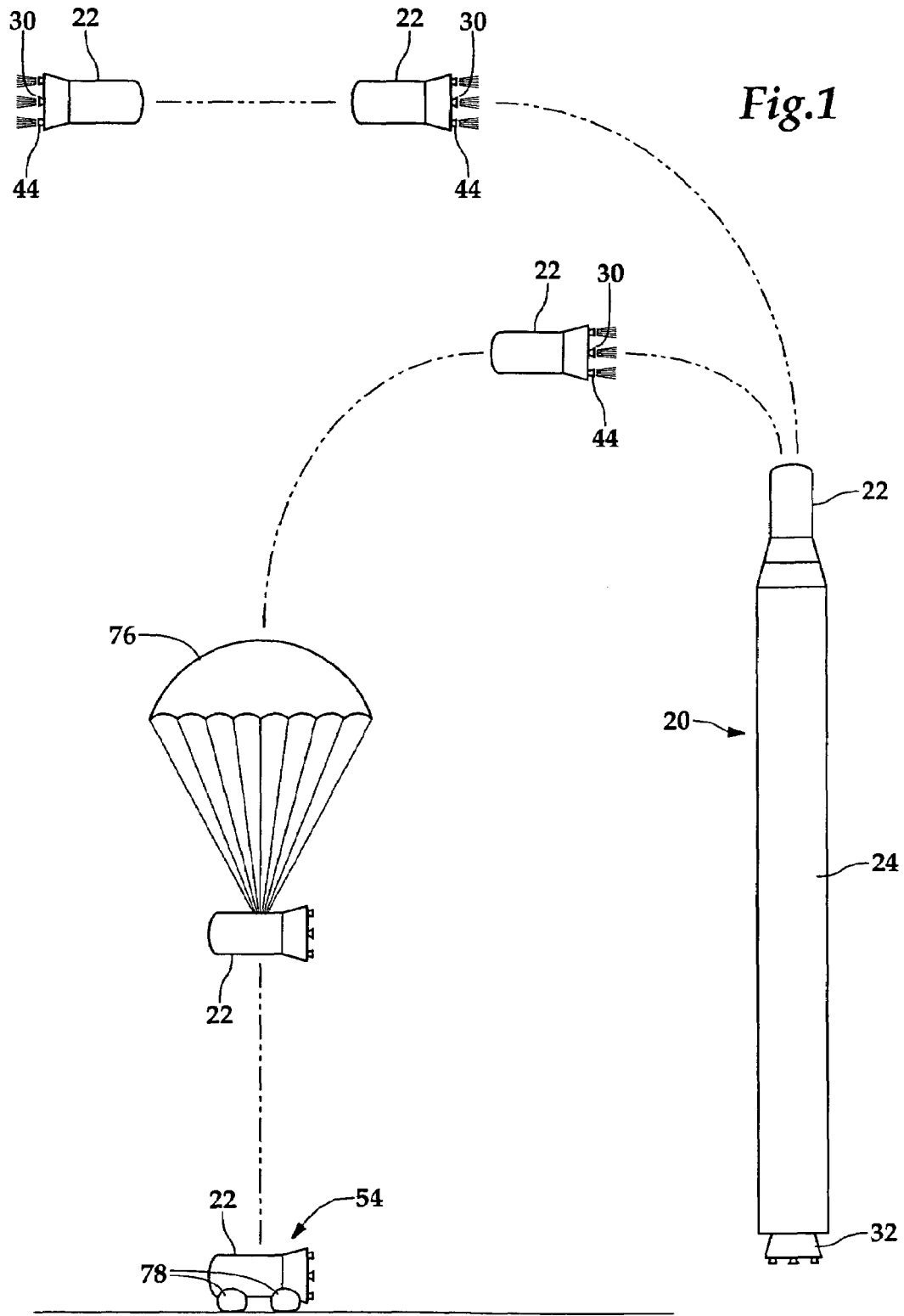
FIG. 1 is a schematic review of the orbital stage system of this invention showing normal orbital stage orbital insertion, and orbital stage abort mode.

Referring more particularly to FIGS. 1-5, wherein like numbers refer to similar parts, an orbital stage system 20 is shown in FIG. 1. The orbital stage system 20 is comprised of an orbital stage 22 mounted to a lower stage 24. The orbital stage system 20 may launch from the ground, or be extracted from the cargo bay of an airplane, or be dropped from external storage on an airplane. If, during operation, the lower stage 24 for any reason fails to operate within a nominal range, an abort mode sensor 26, shown in FIG. 4, detects some failure or out-of-norm parameter, such as excessive yaw, pitch or roll rates, or some abnormal engine chamber pressure. Upon detection of a failure, the abort mode sensor 26 sends a signal to a propulsion system 28 which initiates firing of the abort engine 30. The abort engine 30 accelerate the orbital stage 22 away from the lower stage 24 at an acceleration of three, four, or more times the acceleration due to gravity at the Earth's surface. Such an acceleration must at least be greater than the acceleration experienced by the lower stage due to the engine(s) 32 on the lower stage 24 after the orbital stage has separated, to assure separation between the orbital stage 22 and the lower stage 24.

Figure 4:
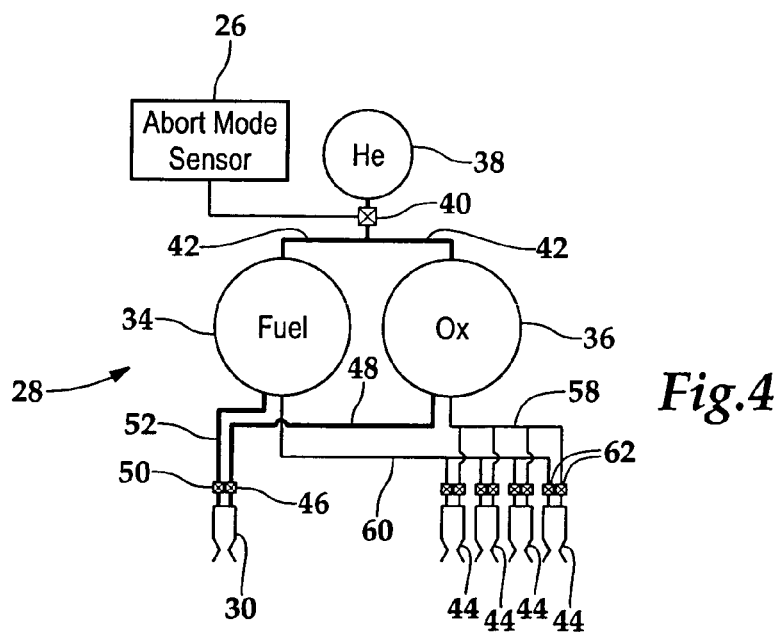
FIG. 4 is a schematic view of the propellant tanks, propellant tank pressurization system and abort and OMS engines of the orbital stage of FIG. 1.

As shown in FIG. 4, the propulsion system 28 incorporates a fuel tank 34, an oxidizer tank 36 and a propellant pressurization tank 38. The propellant pressurization tank 38 is connected through a high-pressure gas control valve 40 such as a regulator and supplies pressurant gas by way of pressurant gas lines 42 to both the fuel tank 34 and the oxidizer tank 36.

The abort engine 30 is connected to the oxidizer tank 36 by a high flow oxidizer line 48, and is connected to the fuel tank 34 by a high flow fuel line 52. However the flow of fuel and oxidizer into the abort engine is blocked by bursts disks 46, 50, located in the oxidizer line 48 and fuel line 52 respectively.

The gas control valve 40 will typically have two settings. The first valve setting is for supplying a nominal pressure to the propellant tanks 34, 36 when a plurality of orbital maneuvering engines 44 are receiving propellants from the propellant tanks. The second setting is set substantially above the first setting so as to cause the bursts disks 46, 50 to open to allow fuel from the fuel tank 34 and oxidizer from the oxidizer tank 36 to be supplied to the abort engine 30.

The abort engine 30 will is designed for light weight, high thrust, and relatively low performance i.e. low Isp. Because in order to obtain high thrust, lightweight, compact size, and operation within the atmosphere, the abort engine will have a relatively low expansion ratio i.e. the ratio between the throat area and the exit area of the abort engine nozzle, an area expansion ratio of about two may be used for example. It is not necessary to stop the flow of propellants to the abort engine 30 because complete propellant exhaustion is desirable to minimize the hazard due to the propellants during an abort landing 54 such as shown in FIG. 1.

Figures 2, 3:
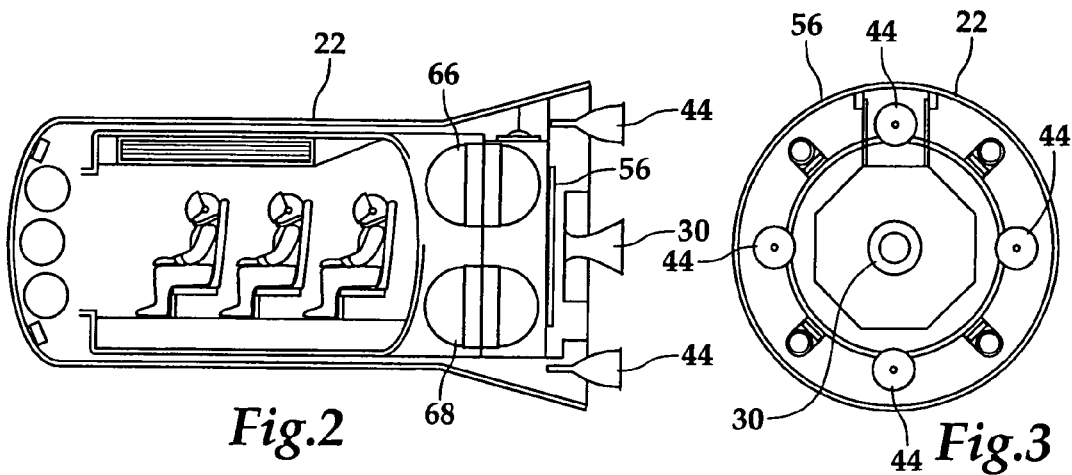
FIG. 2 is a schematic cross-sectional view of the orbital stage of FIG. 1.
FIG. 3 is a schematic end view of the orbital stage of FIG. 1.

As shown in FIGS. 2 and 3 the abort engine 30 is preferably mounted centrally to the rear 56 of the orbital stage 22 so that the thrust of the abort engine 30 acts through the center of gravity of the orbital stage 22. Four orbital maneuvering engines 44 as shown in FIGS. 2 and 3 are mounted symmetrically on the rear 56 of the orbital stage 22 about the abort engine 30. The four orbital maneuvering engines 44 supply redundant orbital adjustment capability. The orbital maneuvering engines 44 will preferably be used to supply the last 1000-2000 fps necessary to obtain orbit. In this way the lower stage 24 will not enter orbit, having substantially less than orbital velocity. The U.S. Space Shuttle external tank, for example, is released with a velocity of about 250 fps less than orbital. However, if the orbital stage is launched on a single lower stage, as much as 2000 fps or more can be added by the OMS engines 44, actually increasing the payload of the orbital stage substantially, for example by about one third to one half, even if the performance (Isp) of the OMS engines 44 with the fuel combination selected are less than the performance (Isp) of the fuel, engines combination of the lower stage 24.

Because historically staging events have been a major cause of launch vehicle failure, a manned launch system for highly reliable access to space, may advantageous use a designed were staging events are substantially eliminated. For example by using a single boost stage where the engine is started and checked out before commitment to launch. The orbital stage separation, occurs when the vehicle has almost reached orbital speed and is above the atmosphere, making the staging events dynamically benign and not time critical. The orbital maneuvering engines 44 are redundant, and the propellent feed system is made simple and reliable by feeding the propellants by gas or vapor pressure.

As shown in FIG. 4, the orbital maneuvering engines 44 are connected to the oxidizer tank 36 and the fuel tank 34 respectively by oxidizer lines 58 and fuel lines 60 which are relatively low flow and thus lightweight. Operation of the engines 44 can be controlled by valves 62 which control the flow of fuel and oxidizer to the engines. The orbital maneuvering engines will typically together have a total thrust of about ⅒ the weight of the orbital stage 22. The thrust being directed parallel to a single vector, and arranged so that the thrust vector is balanced around the center of gravity of the orbital stage. The relatively low thrust of the OMS engines allows the engines to be optimized for vacuum performance with an area ratio of 25, 50 or more. The OMS engines in addition to orbital insertion and orbital circulation burns can also be used for transfer between orbits and for de-orbiting the orbital stage. For orbital stage orientation a separate reaction control system (RCS) is using, Cold or hot gas, may be used for RCS as very low thrust levels are sufficient for stage orientation in orbit.

Figure 5:
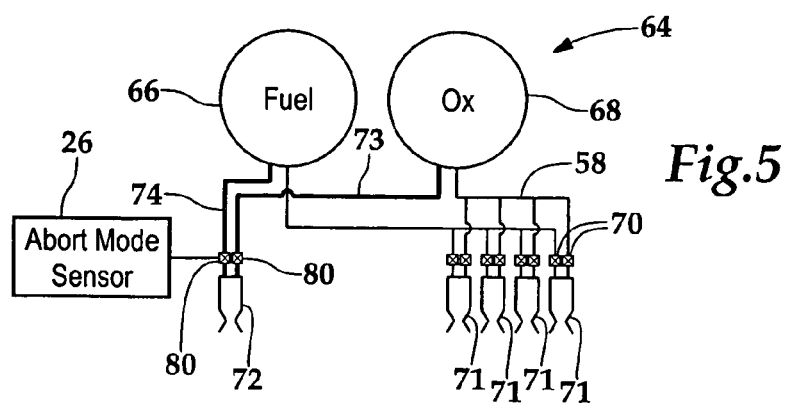
FIG. 5 is a schematic view of an alternative embodiment of the propellant tanks of the orbital stage of FIG. 1, where high-pressure gas propellants or propellants in vapor equilibrium are used.

As shown if FIG. 5, an alternative embodiment propulsion system 64 eliminates the need for a propellant pressurization tank, and utilizes only a fuel tank 66 and an oxidizer tank 68. The elimination of the propellant pressurization tank is possible by using high-pressure gas propellants and high-pressure gas bottle based on modern, high-strength fibers such as polyparaphenylene terephthalamide, graphite, or high modulus polyethylene fibre. The high-strength fibers are used to overwrap a metal or plastic tank. Such lightweight tanks can have a figure of merit of 1-2 million inches (burst pressure of the tank in psi times volume in cubic inches, divided by weight in pounds). Thus tank weights of 20-40 percent of the weight of the propellants contained are possible, depending on the safety factor used and the density of the propellent gases used. For oxygen and methane for example, with tanks having a safety factor of 1.5, and a figure of merit of 2 million inches, the tank weight is about 30 percent of the contained propellants.

Several advantages accrue to the use of high-pressure gas propellants. First, such a system is simple. Second, initial thrust can take advantage of the full pressure at which the propellants are stored which may be 5,000 or even 10,000 psi. Such high propellent supply pressures allow an abort engine of decreased size and weight. For the abort engine, high thrust is needed for separation from the lower stage. Following abort separation, thrust requirements fall rapidly in line with a decreasing gas pressure. At the moment that the abort sequence is started the abort engine should develop sufficient thrust so that the orbital stage accelerates away from the lower or boost stage 24, which may have a considerable acceleration after this orbital stage separates, especially if the boost stage has nearly exhausted its propellants. Depending on the vehicle design accelerations as high as 10 or 15 or more times the force of gravity might be required at the instant of abort separation. Following separation acceleration can be allowed to fall off rapidly. Once the orbital stage separates as shown in FIG. 1, a parachute or a parawing 76 is deployed, and the orbital stage lands with airbags 78 this sequence is also used after normal reentry of the orbital stage from orbit.

The high-pressure gas system in addition to providing higher thrust both for abort and for orbital insertion has simplified valving because the high-pressure gas control valve 40 of FIG. 4 can be eliminated. The regulating function performed by the valve 40 is eliminated for the abort engine 30, and may be eliminated even for the engines 71, although a regulator could be installed between the OMS engines 71 and the propellant tanks 66, 68. The abort engine 72 is connected through high flow abort propellant lines 73, 74 which connect the abort engine 72 directly to the propellant tanks 66, 68. Abort engine valves 80 could be simple lance fractured burst disks, or more conventional valves actuated electromechanically or by using one or both of the propellants as a pressure source.

Another technique also illustrated by FIG. 5 is the use of propellants in equilibrium with their vapor pressure. This propellant pressurization technique, known as VaPak, provides the simplicity of using high-pressure gaseous propellants, with lighter weight tanks. The propellant are stored at a temperature which produces a vapor pressure selected to feed propellents to the abort engine 72 and the OMS engines 71. As propellant is forced out of the propellant tank by vapor pressure, pressure within the tank will fall, and the lower pressure in the tank causes the remaining propellants to boil, producing more vapor. The result of using propellants in equilibrium with their vapor pressure is that all the liquid propellants are expelled while the pressure with which the propellants are supplied decreases only to about two thirds of the initial pressure. After the expulsion of all the liquid from the propellants, the propellant vapors continue to be expelled from the tank.

Vapor pressurization also has the advantage of having maximum thrust when the propellants first begin to flow from the propellant tanks 66, 68. Thus when the abort engine 72 is used, thrust is maximized, when maximum thrust is needed at the beginning of the abort sequence. Further propellant tank pressure can be maintained by adding heat to the propellants as the propellants are cooled by the evolution of pressurizing vapor due to boiling of the propellants. The OMS engines 71 have a relatively long burn time of, for example, 300 to 600 seconds, allowing reasonable heat transfer rate requirements even while the engines are operating. Even more time to add heat to the propellants is available between orbital injection, orbital maneuvering, and reentry burns. OMS propellant flow can be simply controlled by the OMS engine control valves 70. For the abort engine 72, high flow through the abort propellant lines 73, 74 which connect the abort engine 72 directly to the propellant tanks 66, 68. The abort engine valves again could be lance fractured burst disks, or more conventional valves actuated electromechanically or by using one or both of the propellants as a working fluid.

An orbital stage is in orbit when it has a velocity and an orientation with respect to the earth to allow the orbital stage to orbit the earth without intersecting the surface of the earth. A velocity vector is a line in space having a unique instantaneous direction.

It should be understood a mono-propellant e.g. hydrazine, could be used so that the propulsion system 28 would require only the fuel tank 34, fuel lines 52, 60 and only a single fuel valve 50, 62 for each engine 30, 44. The mono-propellant could also be used in of Vapak configuration for example by mixing ammonia with hydrazine to create and a high vapor pressure mono-propellant.

It should be understood, that the abort engine could be used in an emergency to de-orbit the orbital stage. It should be understood that the propellants could be pumped to the abort and/or OMS engines at some loss in simplicity of the propulsion system.

It is understood that the invention is not limited to the particular construction and arrangement of parts herein illustrated and described, but embraces all such modified forms thereof as come within the scope of the following claims.

We claim:

1. An orbital stage comprising:

wherein the orbital stage has an initial mass;

a first propellant tank containing propellent mounted to and forming part of the orbital stage;

a plurality of orbital maneuvering system (OMS) engines, each engine having a selected design thrust and being mounted to and forming part of the orbital stage, and connected to receive a flow of propellent from the first propellent tank;

a valve for each OMS engine arranged to control the flow of propellent from the first propellent tank to the OMS engine;

wherein the combined design thrust of all the OMS engines along a single vector is less than that sufficient to accelerate the orbital stage initial mass at an acceleration of 32.17 ft per second squared;

at least one abort engine having a selected design thrust, the at least one abort engine mounted to and forming part of the orbital stage the orbital stage, and connected to receive a flow of propellent from the first propellent tank, wherein the combined design thrust of the at least one abort engine along a single vector is sufficient to accelerate the orbital stage initial mass at an acceleration greater than about 3 times 32.17 ft per second squared, wherein each of the plurality of OMS engines has an area ratio of at least 25 times an area ratio defined by the at least one abort engine.

* * * * *